Patented Sept. 8, 1931

1,822,548

UNITED STATES PATENT OFFICE

WILLEM P. ter HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.   Application filed December 4, 1929.   Serial No. 411,666.

This invention relates to the treatment of rubber and similar materials, more particularly to a treatment of the same with the reaction products of ketones and salts of aromatic amino compounds. It also relates to the products of such treatment.

An object of this invention is to provide materials having the property of retarding the deterioration of rubber. Another object is to provide materials having the property of improving the resistance of rubber to abrasion; another object is to provide materials which prevent or retard cracking of tread stocks containing carbon black. Other objects will be apparent from the herein-set forth description.

Accordingly the invention comprises treating rubber or similar materials with the reaction product of a ketone and a salt of an aromatic amino compound.

*Examples of reaction products of ketones and salts of aromatic amino compounds.*— Acetone-aniline-hydrochloride, mesityl oxide-aniline-hydrochloride, diacetone alcohol-aniline-hydrochloride, acetone-diphenyl guanidine hydrochloride, acetone-p, p'-di-amino-diphenyl methane hydrochloride, acetone-di-o-tolyl guanidine hydrochloride, acetone-o-tolyl biguanide hydrochloride, acetone-di-phenylamine hydrochloride, acetone-phenyl-beta-naphthylamine hydrochloride, acetone-aniline acetate, acetone-o-toluidine hydrochloride, acetone-o, o'diamino-diphenyl sulfide hydrochloride.

Instead of the ketones mentioned above the following may be used: phorone, diethyl ketone, benzo phenone, aceto-phenone, dichloracetone, aldol acetone, allyl-acetone, benzal acetone, diacetyl, acetyl-acetone, acetonyl-acetone, salicyl aldehyde-acetone, furfural-acetone.

Instead of the aromatic amino compounds mentioned above there may be used: monochlor aniline, ortho-toluidine meta, toluidine, para-toluidine, xylidines, alpha-naphthyl- amine, beta naphthylamine, amino diphenyl, dinaphthylamines, asymmetric diphenyl hydrazine, diamino diphenyl sulphide, diamino diphenyl polysulphides, diamino dinaphthyl sulfides, p-amino benzyl-aniline, dinaphthyl diamino ethane, ditolyl diamino ethane, p-amino-p'naphthylamino diphenyl methane, p-p'-diamino diphenyl dimethyl methane, p-p' dinaphthyl amino diphenyl dimethyl methane, phenyl beta naphthyl guanidine, phenyl-o-tolyl guanidine, dio-o-tolyl biguanide, monophenyl biguanide, diphenyl biguanide, diphenyl acetamidine, o-phenylene diamine, m-phenylene diamine, p-phenylene diamine, dimethyl p-phenylene diamine, m-toluylene diamine, benzidine, naphthylene diamine; 2,2'-diamino diphenyl; 2,4'-diamino diphenyl; diphenyl-p-phenylene diamine, ditolyl-p-phenylene diamine, dinaphthyl-p-phenylene diamine, diphenyl-benzidine, dinaphthyl-benzidine, naphthyl-m-toluylene diamine, dinaphthyl-m-toluylene diamine; 2,4-diamino-diphenylamine; 4,4'-diamino diphenylamine; or mixtures of any of the foregoing aromatic amino compounds with a phenol such as phenol, alpha-naphthol, beta-naphthol.

In the reactions of ketones with salts of aromatic amino compounds, such aromatic amino compounds as contain at least one ortho or para carbon atom linked to hydrogen, have been found to be most suitable.

The reaction may be carried out with or without the aid of a dehydrating agent. The following chemicals or mixtures thereof may be used as dehydrating agents: Calcium chloride, iodine, sulphanilic acid, hydrochloric acid, sulphuric acid, phosphorus pentoxide, sodium hydroxide, magnesium perchlorate, acetic acid, barium oxide, zinc chloride, etc. It is an advantage to use the amine-addition product with zinc chloride, for example $(C_6H_5NH_2), ZnCl_2$, as a dehydrating agent.

*Example 1.*—Reaction product of ketones and salts of amino compounds. By heating one mole of aniline hydrochloride and approximately four moles of acetone in an autoclave at 170° C. during 72 hours a reaction occurs during which methane is produced as a by-product. After cooling the reaction mixture, the methane is allowed to escape and the reaction product is freed from unreacted acetone. By neutralization with caustic soda and separation of the product a material is obtained which is a powerful antioxidant. The material is semi-solid and turns solid on standing. The results of tests in a tire tread compound are as follows:

|  | Green tensiles | Blank | +Reaction product |
|---|---|---|---|
| (Cure) | 60′ at 45# | 4175 | 4092 |
| (Cure) | 75′ at 45# | 4245 | 3940 |
| (Cure) | 90′ at 45# | 4285 | 4055 |
|  | Aged 168 hrs. in oxygen |  |  |
| (Cure) | 60′ at 45# | 1510 | 3190 |
| (Cure) | 75′ at 45# | 1310 | 3030 |
| (Cure) | 90′ at 45# | 1250 | 2900 |

The structure of these reaction products is not definitely known.

Aniline-acetate may be used in place of aniline-hydrochloride in the reaction. In this case tire tread compounds tested for resistance to abrasion gave the following values:

| 60′ cure | Relative wear |
|---|---|
| Blank | 154 |
| +.75 parts of reaction product | 181 |

*Example 2.*—Diphenylguanidine-hydrochloride was found to react readily with acetone. A temperature of 120° C. and a reaction time of 20 hours are required to obtain a practically complete reaction. In this case, again, methane is produced. The acetone-diphenylguanidine-hydrochloride reaction product is prepared as follows:

211 grams diphenylguanidine (1 mole) are added to 110 grams 36% aqueous hydrochloric acid. The solution of diphenylguanidine hydrochloride is filtered through glass wool and can be used as such, without removal of water. 400 grams of acetone are added and the mixture is heated in an autoclave at 120° C. during 20 hours. After cooling, the methane formed is blown off, excess acetone is recovered and the hydrochloric acid is neutralized with 10% sodium hydroxide solution. The resulting product is an oil which floats on top of the water layer. After separation from the water it can be used without further purification.

1.5 parts of the reaction product of acetone and diphenylguanidine hydrochloride per 100 parts of rubber are incorporated in the usual manner in a tire tread compound. The resulting stocks are aged in the oxygen bomb for 168 hours. A similar stock is made from which the antioxidant is omitted. The mix is vulcanized and aged under the same conditions. The tensile strengths before and after ageing are shown below.

| Cure | Tensiles | |
|---|---|---|
|  | Blank | +Reaction product |
| BEFORE AGEING | | |
| 50′ at 45# | 4075 | 4225 |
| 60′ at 45# | 4065 | 3985 |
| 75′ at 45# | 4020 | 3885 |
| 90′ at 45# | 4010 | 4160 |
| AFTER AGEING | | |
| 50′ at 45# | 1375 | 2685 |
| 60′ at 45# | 1285 | 2820 |
| 75′ at 45# | 1205 | 2495 |
| 90′ at 45# | 1215 | 2520 |

*Example 3.*—Reaction product of acetone and phenyl beta-naphthylamine hydrochloride.

74 grams of phenyl beta-naphthylamine are added to 40 grams of concentrated aqueous hydrochloric acid. The hydrochloride thus obtained is dried at 120° C. and yields 81.5 grams of phenyl beta-naphthylamine hydrochloride. 300 grams of acetone are added and the mixture is heated in an autoclave at 170–190° C. for 30 hrs. After cooling, the methane formed is blown off, excess acetone is recovered and the hydrochloric acid is neutralized with 10% caustic soda solution. After separation from the water and drying, the reaction product is a brown powder; yield, about 111 grams.

1.5 parts of the reaction product of acetone and phenyl beta-naphthylamine hydrochloride per 100 parts of rubber are incorporated in the usual manner in a tire tread compound. The resulting stock are aged in an oxygen bomb. A similar stock is made from which the reaction product is omitted. This mix is vulcanized and aged under the same conditions. The tensile strengths before and after ageing are shown below.

| Cure | Tensiles | |
|---|---|---|
|  | Blank | +Reaction product |
| BEFORE AGEING | | |
| 45′ at 45# | 3075 | 3355 |
| 60′ at 45# | 3630 | 4010 |
| 75′ at 45# | 4165 | 3845 |
| 90′ at 45# | 3725 | 3740 |
| AFTER AGEING 168 HRS. IN OXYGEN BOMB | | |
| 45′ at 45# | 1080 | 2450 |
| 60′ at 45# | 895 | 2585 |
| 75′ at 45# | 785 | 2045 |
| 90′ at 45# | 748 | 2800 |
| AFTER AGEING 3 WEEKS AT 158° F. | | |
| 45′ at 45# | 1935 | 2953 |
| 60′ at 45# | 1753 | 3117 |
| 75′ at 45# | 1397 | 2950 |
| 90′ at 45# | 1440 | 3027 |

*Example 4.*—The reaction product of acetone and the hydrochloride of o-tolyl biguanide is made in a way simliar to the preparation of the reaction product of acetone and diphenyl guanidine hydrochloride. The material was tested in the usual manner with the following results:

| Tensiles | Blank | +Reaction product |
|---|---|---|
| BEFORE AGEING | | |
| 60′ at 45# | 4390 | 4325 |
| 75′ at 45# | 4275 | 4555 |
| 90′ at 45# | 4375 | 4205 |
| AFTER AGEING 168 HRS. IN OXYGEN BOMB | | |
| 60′ at 45# | 1255 | 2585 |
| 75′ at 45# | 1170 | 2335 |
| 90′ at 45# | 1065 | 2065 |

*Example 5.*—30 part of p,p′-diamino diphenyl methane are transformed into the hydrochloride either by adding concentrated hydrochloric acid to the amine and evaporating to dryness, or by dissolving or suspending p,p′-diamino diphenyl methane in a minimum amount of acetone and passing dry hydrochloric acid gas through the mixture. Acetone is then added to the hydrochloride and the mass is heated in an autoclave during 20 hours at approximately 140° C., in the presence of a small amount of iodine as a catalyst. The reaction mixture is then allowed to cool and the gas pressure is released by opening the valve of the autoclave. Excess acetone is then recovered by distillation and approximately 10% caustic soda solution is added in order to make the mass alkaline. The reaction product usually floats on top of the aqueous solution and is separated. Low-boiling material is removed by distillation under vacuum. The final product is a brown powder having excellent antioxidant properties. The material was tested in the usual way. The results of the test were as follows:

| Tensiles | Blank | +Reaction product |
|---|---|---|
| BEFORE AGEING | | |
| 60′ at 45# | 4195 | 4160 |
| 75′ at 45# | 4315 | 4125 |
| 90′ at 45# | 4160 | 4190 |
| TENSILES AFTER AGEING 168 HRS. IN OXYGEN BOMB | | |
| 60′ at 45# | 1245 | 2955 |
| 75′ at 45# | 1155 | 2755 |
| 90′ at 45# | 998 | 2640 |

*Example 6.*—100 parts of diphenylamine hydrochloride and 300 parts of acetone are heated in an autoclave during 30 hrs. at 170–190° C. The oil obtained is filtered and neutralized with dilute aqueous sodium carbonate solution. 150 parts of the reaction product are obtained. 1½ parts of the reaction product are incorporated in the usual manner in a standard tire tread compound containing 100 parts of rubber, 50 parts carbon black and a mixture of 1 part of hexamethylene tetramine and .25 parts of diphenyl guanidine. A similar mix was made but omitting the reaction product. The mixes are vulcanized in a mold for 60 minutes and 75 minutes at 45 pounds steam pressure. Samples of the resulting stocks are aged for 168 hours in the oxygen bomb, and for 3 weeks in air at 158° F. Values are given below:

| | Tensiles before ageing | Tensiles after ageing | |
|---|---|---|---|
| | | Oxygen | Air |
| BLANK | | | |
| 60′ | 4065 | 1095 | 1787 |
| 75′ | 4070 | 985 | 1563 |
| + REACTION PRODUCT | | | |
| 60′ | 4005 | 2660 | 3350 |
| 75′ | 3975 | 2790 | 3320 |

*Example 7.*—Ortho toluidine hydrochloride and acetone are reacted in the same manner as in Example 6 to produce the reaction product. 1 part of the reaction product was used in the usual way in a standard tire tread compound containing 100 parts rubber, 42 parts carbon black, .875 parts of dinitro phenyl dimethyl dithiocarbamate. A similar mix was made but omitting the reaction product. The mixes are vulcanized in a mold for 60 minutes at 25 pounds steam pressure. Samples of the resulting stocks are aged during 3 weeks in air at 158° F. Values are given below:

| | Tensiles before ageing | Tensiles after ageing |
|---|---|---|
| Blank | 4650 | 1081 |
| + Reaction product | 5027 | 3893 |

The vulcanized stocks are tested to show their resistance to cracking under repeated stresses due to alternate stretching and bending. Values are given in kilocycles, one kilocycle indicating a complete cycle of stretching and bending repeated 1000 times. Definite cracking of the stock indicates the end point.

| | Kilocycles |
|---|---|
| Blank | 88 |
| + Reaction product | 120 |

It is to be understood that a mixture of the reaction products may be used in rubber instead of a single reaction product. Also that a mixture of ketones, or a single ketone may be reacted with a single amino compound or with a mixture of amino compounds, such as described herein, to give products that may be used in rubber in the same manner.

The chemicals disclosed may be used to improve the properties as mentioned herein of inner tubes, tires, thread, hose, dipped goods, mechanical goods, latex or articles made from latex etc.

"Salt of an aromatic amino compound" and "amine salt" in the claims are to be understood as meaning the acid addition product of the amines or amino compounds, such as the hydrochloride, the sulfate, the phosphate, the acetate, etc. Also the term "rubber" is to be construed as including natural rubber, gutta percha, balata, synthetic rubber, or other rubber-like materials.

With the detailed description given above, it will be obvious that modifications will suggest themselves without departing from the principle of the invention, for example in the preparation of any of the herein mentioned compounds, the corresponding thioketone or the corresponding ketone dihalide may be used in place of a ketone, and it is not desired to limit the invention otherwise than as set forth in the appended claims.

Having thus described my invention, what I claim and desire to protect by Letters Patent is:

1. A method of treating rubber which comprises treating rubber with the reaction product of a ketone and a salt of an aromatic amino compound.

2. A method of treating rubber which comprises treating rubber with the reaction product of an aliphatic ketone and a salt of an aromatic amino compound.

3. A method of treating rubber which comprises treating rubber with the reaction product of a ketone and an aromatic amine-salt.

4. A method of treating rubber which comprises treating rubber with the reaction product of a ketone and an acid addition product of a compound comprising the group R—X—R' in which R and R' each comprise an aryl group and an amino group and X represents $S_x$, $C_nH_{2n}$, or $C=NH$.

5. A method of treating rubber which comprises treating rubber with the reaction product of a ketone and an acid addition product of a compound comprising the group R—X—R' in which R and R' each comprise an aryl group and an amino group and X represents $C_nH_{2n}$, or $C=NH$.

6. A method of treating rubber which comprises treating rubber with the reaction product of a ketone and an acid addition product of a di(amono aryl) alkylene compound.

7. A method of treating rubber which comprises treating rubber with the reaction product of an aliphatic ketone and an acid addition product of a di(amino aryl) alkylene compound.

8. A method of treating rubber which comprises treating rubber with the reaction product of a dialkyl ketone and the hydrochloride of p-p'-diamino diphenyl methane.

9. A method of treating rubber which comprises treating rubber with the reaction product of acetone and the hydrochloride of p-p'-diamino diphenyl methane.

10. A method of treating rubber which comprises treating rubber with the reaction product of a ketone and the acid addition product of a primary aromatic amine.

11. A method of treating rubber which comprises treating rubber with the reaction product of an aliphatic ketone and the acid addition product of a primary aromatic amine.

12. A method of treating rubber which comprises treating rubber with the reaction product of a dialkyl ketone and the acid addition product of a primary aromatic amine.

13. A method of improving the properties of rubber which comprises vulcanizing rubber in the presence of the reaction product of a ketone and a salt of an aromatic amino compound.

14. A method of improving the properties of rubber which comprises vulcanizing rubber in the presence of the reaction product of an aliphatic ketone and a salt of an aromatic amino compound.

15. A method of improving the properties of rubber which comprises vulcanizing rubber in the presence of the reaction product of a ketone and an aromatic amine-salt.

16. A method of improving the properties of rubber which comprises vulcanizing rubber in the presence of the reaction product of a ketone and an acid addition product of a compound comprising the group R—X—R' in which R and R' each comprise an aryl group and an amino group and X represents $S_x$, $C_nH_{2n}$, or $C=NH$.

17. A method of improving the properties of rubber which comprises vulcanizing rubber in the presence of the reaction product of a ketone and an acid addition product of a compound comprising the group R—X—R' in which R and R' each comprise an aryl group and an amino group and X represents $C_nH_{2n}$, or $C=NH$.

18. A method of improving the properties of rubber which comprises vulcanizing rubber in the presence of the reaction product of a ketone and an acid addition product of a di(amino aryl) alkylene compound.

19. A method of improving the properties of rubber which comprises vulcanizing rubber in the presence of the reaction product of a dialkyl ketone and the hydrochloride of p-p'-diamino diphenyl methane.

20. A method of improving the properties of rubber which comprises vulcanizing rubber in the presence of the reaction product of acetone and the hydrochloride of p-p'-diamino diphenyl methane.

21. A method of improving the properties of rubber which comprises vulcanizing rubber in the presence of the reaction product of a ketone and the acid addition product of a primary aromatic amine.

22. A method of improving the properties of rubber which comprises vulcanizing rubber in the presence of the reaction product of acetone and aniline hydrochloride.

23. A method of improving the properties of rubber which comprises vulcanizing rubber in the presence of the reaction product of acetone and a toluidine hydrochloride.

24. A method of improving the properties of rubber which comprises vulcanizing rubber in the presence of the reaction product of acetone and o-toluidine hydrochloride.

25. A method of improving the properties of rubber which comprises vulcanizing rubber in the presence of the reaction product of an aliphatic ketone and an acid addition product of a di(amino aryl) alkylene compound.

26. A method of improving the properties of rubber which comprises vulcanizing rubber in the presence of the reaction product of an aliphatic ketone and the acid addition product of a primary aromatic amine.

27. A method of improving the properties of rubber which comprises vulcanizing rubber in the presence of the reaction product of a dialkyl ketone and the acid addition product of a primary aromatic amine.

28. A method of treating rubber which comprises treating rubber with the reaction product of acetone and aniline hydrochloride.

29. A method of treating rubber which comprises treating rubber with the reaction product of acetone and a toluidine hydrochloride.

30. A method of treating rubber which comprises treating rubber with the reaction product of acetone and o-toluidine hydrochloride.

31. A rubber product derived from rubber treated with the reaction product of a ketone and a salt of an aromatic amino-compound.

32. A rubber product derived from rubber treated with the reaction product of a ketone and an aromatic amine-salt.

33. A rubber product derived from rubber treated with the reaction product of a ketone and an acid addition product of a di(amino aryl) alkylene compound.

34. A rubber product derived from rubber treated with the reaction product of a dialkyl ketone and an acid addition product of a di(amino aryl) alkylene compound.

35. A rubber product derived from rubber treated with the reaction product of acetone and the hydrochloride of p-p'-diamino diphenyl methane.

36. A rubber product derived from rubber treated with the reaction product of a ketone and the acid addition product of a primary aromatic amine.

37. A rubber product derived from rubber treated with the reaction product of an aliphatic ketone and the acid addition product of a primary aromatic amine.

38. A rubber product derived from rubber treated with the reaction product of a dialkyl ketone and the acid addition product of a primary aromatic amine.

39. A rubber product derived from rubber treated with the reaction product of acetone and aniline hydrochloride.

40. A rubber product derived from rubber treated with the reaction product of acetone and a toluidine hydrochloride.

41. A rubber product derived from rubber treated with the reaction product of acetone and o-toluidine hydrochloride.

42. A vulcanized rubber product derived from rubber treated with the reaction product of a ketone and a salt of an aromatic amino compound.

43. A vulcanized rubber product derived from rubber treated with the reaction product of a ketone and an aromatic amine-salt.

44. A vulcanized rubber product resulting from the process set forth in claim 13.

45. A vulcanized rubber product resulting from the process set forth in claim 14.

46. A vulcanized rubber product resulting from the process set forth in claim 15.

47. A vulcanized rubber product resulting from the process set forth in claim 16.

48. A vulcanized rubber product resulting from the process set forth in claim 17.

49. A vulcanized rubber product resulting from the process set forth in claim 18.

50. A vulcanized rubber product resulting from the process set forth in claim 19.

51. A vulcanized rubber product resulting from the process set forth in claim 20.

52. A vulcanized rubber product resulting from the process set forth in claim 21.

53. A vulcanized rubber product resulting from the process set forth in claim 22.

54. A vulcanized rubber product resulting from the process set forth in claim 23.

55. A vulcanized rubber product resulting from the process set forth in claim 24.

56. A vulcanized rubber product resulting from the process set forth in claim 25.

57. A vulcanized rubber product resulting from the process set forth in claim 26.

58. A vulcanized rubber product resulting from the process set forth in claim 27.

Signed at New York, county and State of New York, this 23d day of November, 1929.

WILLEM P. ter HORST.